(12) United States Patent
Xiang

(10) Patent No.: US 11,905,739 B2
(45) Date of Patent: Feb. 20, 2024

(54) MANUAL/AUTOMATIC DUAL-PURPOSE CLUTCHING STRUCTURE

(71) Applicant: Dezhao Xiang, Guangdong (CN)

(72) Inventor: Dezhao Xiang, Guangdong (CN)

( * ) Notice: Subject to any disclaimer, the term of this patent is extended or adjusted under 35 U.S.C. 154(b) by 0 days.

(21) Appl. No.: 18/129,905

(22) Filed: Apr. 3, 2023

(65) Prior Publication Data

US 2023/0235597 A1     Jul. 27, 2023

Related U.S. Application Data

(63) Continuation-in-part of application No. 17/520,730, filed on Nov. 8, 2021, now abandoned.

(51) Int. Cl.
*E05B 47/00*     (2006.01)

(52) U.S. Cl.
CPC .... *E05B 47/0012* (2013.01); *E05B 2047/002* (2013.01); *E05B 2047/0026* (2013.01); *E05Y 2800/11* (2013.01)

(58) Field of Classification Search
CPC . E05B 2047/002; F16D 43/2028; F16D 11/16
See application file for complete search history.

(56) References Cited

U.S. PATENT DOCUMENTS

| | | | | |
|---|---|---|---|---|
| 7,758,041 B2 * | 7/2010 | Okuno | ................... | B65H 3/565 271/10.04 |
| 8,556,256 B2 * | 10/2013 | Ito | .......................... | B65H 85/00 271/902 |
| 9,908,422 B2 * | 3/2018 | Bianco | .................... | B60L 53/18 |
| 2020/0181945 A1 * | 6/2020 | Zhao | .................... | E05B 47/0012 |

* cited by examiner

*Primary Examiner* — Huan Le

(57) ABSTRACT

A manual/automatic dual-purpose clutching structure includes a driving gear assembly, a reversing clutching assembly and a driven gear assembly. The driving gear assembly includes a first gear, a second gear and a driving module, the first gear being coaxially and fixedly connected to the second gear. The reversing clutching assembly includes a reversing gear and a reset spring, the reversing gear is located on one side of and meshes with the second gear. The driven gear assembly includes an output gear which is located on the other side of and does not make contact with the second gear. The reversing gear rotates around a central axis of the second gear under a driving of the driving module to mesh with the output gear. After power of the driving module disappears, the reversing gear is prompted to be disengaged from the output gear under an action of the reset spring.

17 Claims, 10 Drawing Sheets

MANUAL/AUTOMATIC DUAL-PURPOSE CLUTCHING STRUCTURE

CROSS-REFERENCE TO RELATED APPLICATIONS

This application is a continuation-in-part application of application Ser. No. 17/520,730, filed on Nov. 8, 2021. The content of the aforementioned application, including any intervening amendments thereto, are incorporated herein by reference.

TECHNICAL FIELD

The present invention relates to the technical field of gear clutching transmission, in particular to a manual/automatic dual-purpose clutching structure.

BACKGROUND

Locks are used by lock owners to seal up articles. Traditional locksets are of mechanical structures and match adaptive keys for unlocking. With the progress of science and technology and the development of intelligent furniture, electronic locks appear, and "keys" are biological features of lock owners, such as fingerprints, voice prints and faces.

When power is suddenly lost due to short service life, easy failure, etc. of the electronic product, the gear cannot be twisted due to fit jamming of the gear. As a result, the intelligent electronic product cannot be used, resulting in the problems existing in the field of intelligent home, for example, when the rainstorm comes, the window cannot be closed, the curtain cannot be stretched, and the door lock cannot be opened and closed.

SUMMARY

(1) Technical Problem to be Solved

Aiming at the defects of the prior art, the present invention provides a manual/automatic dual-purpose clutching structure, which solves the problem that when power is suddenly lost due to short service life, easy failure, etc. of an electronic product in a narrow space, a gear may not be mechanically twisted due to fit jamming of the gear.

(2) Technical Solution

In order to achieve the above objective, the present invention is achieved by means of the following technical solutions: a manual/automatic two-purpose clutching structure including a driving gear assembly, a reversing clutching assembly and a driven gear assembly, wherein the driving gear assembly includes a first gear, a second gear and a driving module, the first gear being coaxially and fixedly connected to the second gear;

the reversing clutching assembly includes a reversing gear and a reset spring, the reversing gear is located on one side of the second gear of the driving gear assembly and meshes with the second gear of the driving gear assembly;

the driven gear assembly includes an output gear which is located on the other side of the second gear of the driving gear assembly and does not make contact with the second gear of the driving gear assembly;

the reversing gear rotates clockwise or anticlockwise around a central axis of the second gear of the driving gear assembly under a driving of the driving module to mesh with the output gear of the driven gear assembly; and after power of the driving module disappears, the reversing gear is prompted to be disengaged from the output gear under an action of the reset spring on the reversing gear.

In some embodiments, the reversing clutching assembly includes a gear carrier, the gear carrier includes a bottom plate, a top plate and a connecting rod being fixedly connected between the bottom plate and top plate, the reversing gear is mounted around the connecting rod and sandwiched between the bottom plate and top plate, and the bottom plate defines a through hole for extending of the second gear.

In some embodiments, an outer side of the top plate away from the reversing gear is provided with a retaining column, and the reset spring is arranged on the outer side of the top plate with one end thereof abutting against the retaining column.

In some embodiments, the driving module includes a driving motor and a transmission gear, the transmission gear includes a third gear and a fourth gear, the third gear is coaxially and fixedly connected to the fourth gear, the third gear is in transmission connection with the driving motor, and the fourth gear meshes with the first gear.

In some embodiments, a worm is mounted around a rotary shaft of the driving motor and meshes with the third gear.

In some embodiments, the driving gear assembly, the reversing clutching assembly and the driven gear assembly are received in a housing body, a cover plate is fixed on the housing body, and the output gear has an output shaft extending through the housing body and/or cover plate for connecting a load.

Further, the present invention is achieved by means of the following technical solutions: a manual/automatic dual-purpose clutching structure including:

a driving gear assembly including a rotatable gear and a driving motor for driving the rotatable gear to rotate;

a reversing clutching assembly including a reversing gear meshing with the rotatable gear and a reset member acting with the reversing gear; and a driven gear assembly including an output gear spaced from the rotatable gear; wherein when the driving motor starts, the reversing gear revolves around the rotatable gear from a disengaged position where the reversing gear is disengaged from the output gear to an engaged position where the reversing gear is engaged with the output gear, and the reset member is deformed; and when the driving motor stops, the deformed reset member restores to its original state and in turn restore the reversing gear to the disengaged position.

In some embodiments, the rotatable gear includes a first gear and a second gear, the second gear is less than the first gear in diameter, the first gear is in transmission connection with the driving motor, and the second gear meshes with the reversing gear.

In some embodiments, a transmission gear is arranged between the first gear and the driving motor, the transmission gear includes a third gear and a fourth gear, the fourth gear is less than the third gear in diameter, the third gear is in transmission connection with the driving motor, and the fourth gear meshes with the first gear.

In some embodiments, a worm is mounted around a rotary shaft of the driving motor and meshes with the third gear.

In some embodiments, the first gear and second gear are coaxial, a rotating pivot is provided at middles of the first gear and second gear in penetrating manner, and the reset member is a torsion spring and mounted around the rotating pivot.

In some embodiments, the reversing clutching assembly includes a gear carrier, the gear carrier includes a bottom plate, a top plate and a connecting rod connected between the bottom plate and top plate, the reversing gear is mounted around the connecting rod, a retaining column is provided on the top plate at a positon corresponding to the reversing gear, and one end of the reset member abuts against the retaining column.

In some embodiments, the bottom plate defines a through hole, and the second gear extends into the gear carrier via the through hole.

In some embodiments, the driving gear assembly, the reversing clutching assembly and the driven gear assembly are received in a housing, and the other end of the reset member is fixed to the housing.

In some embodiments, the housing forms a sleeve for supporting a rotating pivot of the second gear, and the reset member is mounted around the sleeve.

In some embodiments, the output gear has an output shaft which extends through the housing for driving a latching tab of an electronic lock.

In some embodiments, a radial gap is defined between the second gear and output gear with a width less than the diameter of the reversing gear.

(3) Beneficial Effects

The present invention provides the manual/automatic dual-purpose clutching structure, and has the following beneficial effects: the clutching structure of the present invention is simple, has small size, and may be used on a small electronic product.

Figure 1:
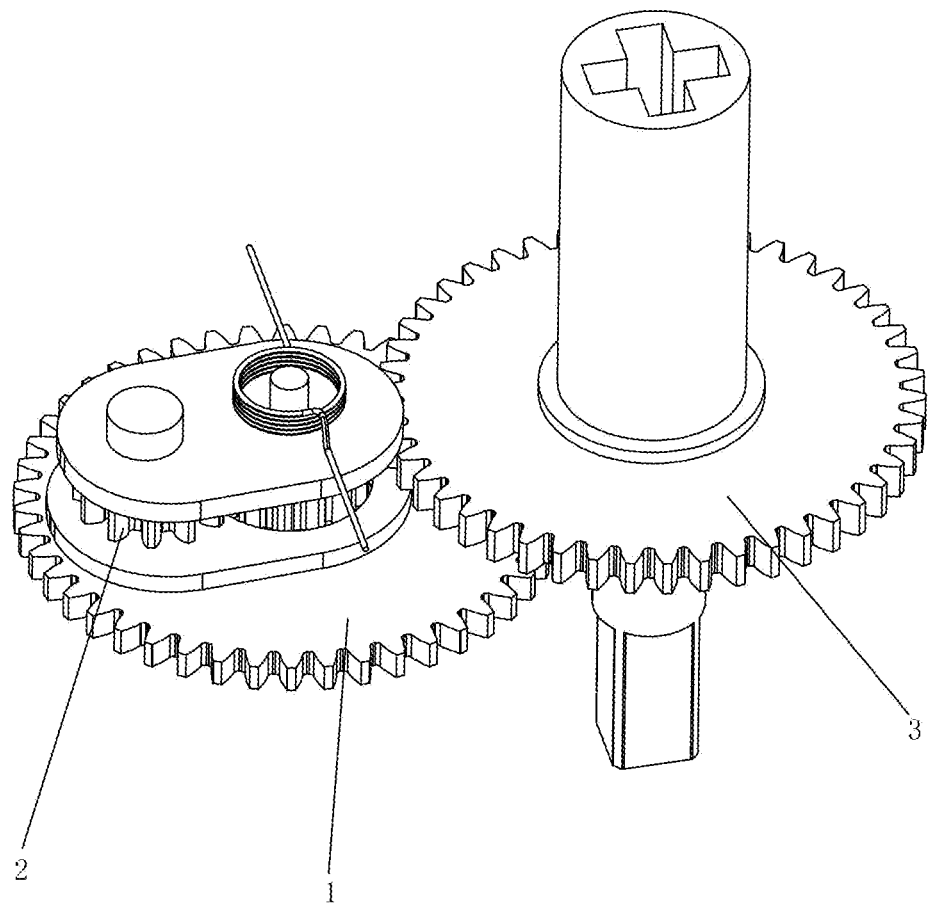
FIG. 1 is a schematic diagram of a clutching structure according to an embodiment of the present invention.

IN THE FIGURES 1, driving gear assembly;
101, first gear;
102, second gear;
2, reversing clutching assembly;
201, reversing gear;
202, reset member
3, driven gear assembly;
301, output gear;
302, output shaft
4, gap;
5, gear carrier;
501, bottom plate;
502, connecting rod;
503, retaining column;
504, top plate;
505, through hole;
6, housing;
601, housing body;
602, cover plate;
603, 604, rotating pivot;
605, sleeve;
606, bearing;
7, driving module;
701, driving motor;
702, worm;
703, transmission gear;
704, third gear; and
705, fourth gear.

DESCRIPTION OF THE EMBODIMENTS

The following clearly and completely describes the technical solution of the embodiment of the present invention in conjunction with the accompanying drawings of the embodiment of the present invention. Apparently, the embodiment described is merely some rather than all of the embodiments of the present invention. Based on the embodiment in the present invention, all other embodiments acquired by those of ordinary skill in the art without making creative efforts fall within the scope of protection of the present invention.

As shown in FIG. 1, an embodiment of the present invention provides a manual/automatic dual-purpose clutching structure. The manual/automatic dual-purpose clutching structure includes a driving gear assembly 1, a reversing clutching assembly 2 and a driven gear assembly 3, wherein the reversing clutching assembly 2 is arranged between the driving gear assembly 1 and the driven gear assembly 3.

Figure 2:
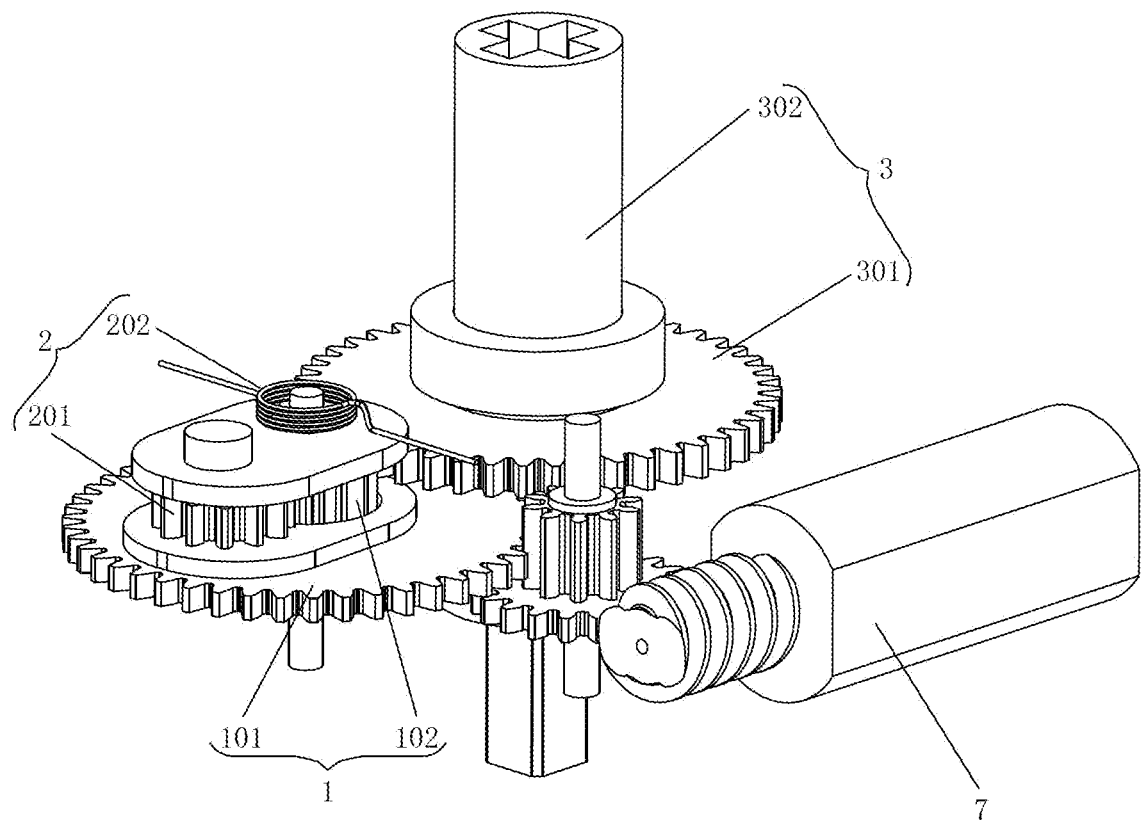
FIG. 2 is a schematic diagram of transmission cooperation of the clutching structure of the present invention with a driving module.
Figure 5:
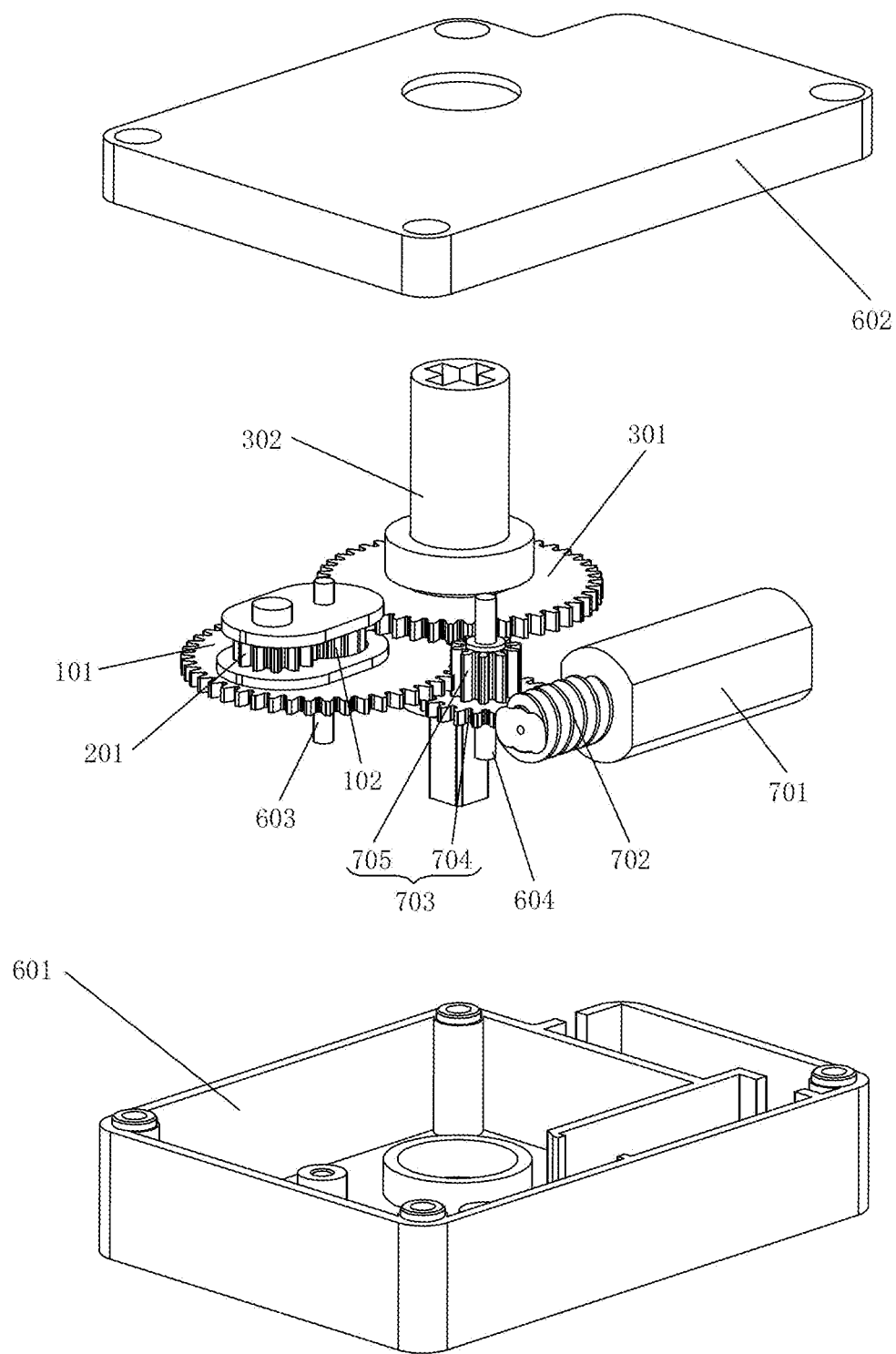
FIG. 5 is an exploded view of the clutching structure of FIG. 4.

Referring to FIG. 2 and FIG. 5, the driving gear assembly 1 includes a rotatable gear. In this embodiment, the rotatable gear includes a first gear 101 and a second gear 102 which are coaxially and fixedly connected to each other, thereby the first gear 101 and second gear 102 are capable of rotating synchronously. Preferably, the first gear 101 and the second gear 102 are integrally formed as one piece. Preferably, a diameter of the first gear 101 is greater than that of the second gear 102. The first gear 101 is configured for connecting a driving module 7, and the second gear 102 is configured for connecting the reversing clutching assembly 2. The driving gear assembly 1 in whole acts as a decelerating transmission mechanism.

The reversing clutching assembly 2 includes a reversing gear 201 and a reset member 202 acting with the reversing gear 201. The reversing gear 201 and the second gear 102 of the driving gear assembly 1 are arranged side by side, the central axis X1 of the second gear 102 is parallel to the central axis X2 of the reversing gear 201. The reversing gear 201 and the second gear 102 mesh with each other, thereby the second gear 102 being able to drive the reversing gear 201 to rotate. The reversing gear 201 is capable of revolving around both the central axis X1 of the second gear 102 and its own central axis X2 under the driving of the driving gear assembly 1. During revolving of the reversing gear 201 around the central axis X1 of the second gear 102, it swing between an engaged position and an disengaged position.

The driven gear assembly 3 includes an output gear 301, which is arranged at a lateral side of the driving gear assembly 1. The output gear 301 and the second gear 102 are arranged side by side and spaced from each other, the central axis X3 of the output gear 301 is parallel to the central axis X1 of the second gear 102. A radial gap 4 is defined between the output gear 301 and second gear 102 with a width less than the diameter of the reversing gear 201, so that the reversing gear 201 can not pass through the gap 4. The output gear 301 has an output shaft 302 provided at a central portion thereof, the output shaft 302 is configured for connecting a load, such as a movable component of an electronic product, particularly a locking tab of an electronic lock (not shown). Preferably, the output shaft 302 and output gear 301 are integrally formed as one piece.

Figure 7:
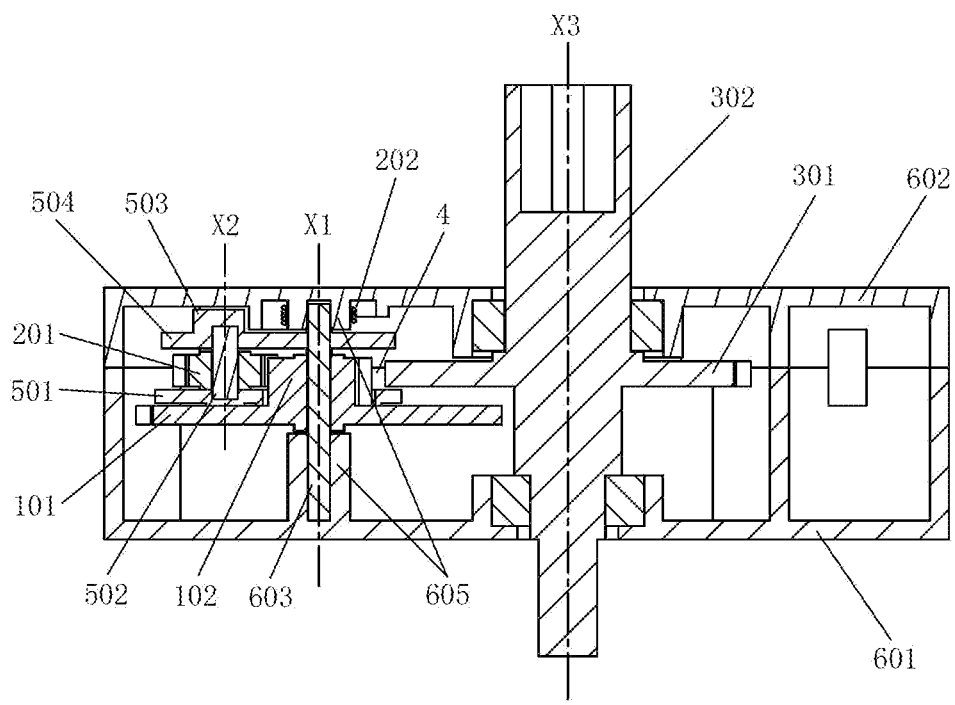
FIG. 7 is a cross sectional view of the clutching structure of FIG. 4.
Figure 8:
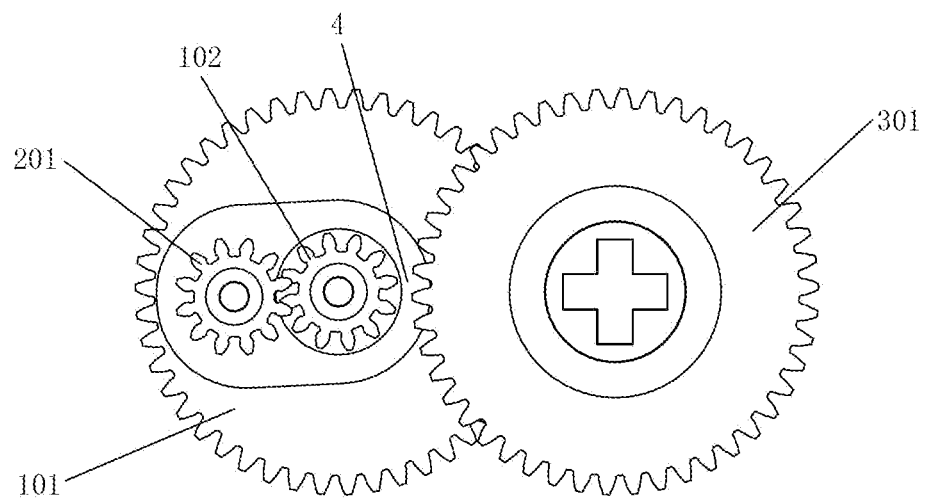
FIG. 8 is a plan view showing a position relationship of reversing and output gears of the clutching structure in a disengaged state.

At the disengaged position, as shown in FIGS. 7-8, the reversing gear 201 of the reversing clutching assembly 2 is away from output gear 301 of the driven gear assembly 3, and torque cannot be transmitted from the driving gear assembly 1 to the driven gear assembly 3. At the engaged position, as shown in FIGS. 9-12, the reversing gear 201 swings clockwise or anticlockwise towards the gap 4 to mesh with the output gear 301. In this situation, the output gear 301 is capable of rotating a predetermined angle about its central axis X3 under the driving of the reversing gear 201, thereby torque being transmitted from the driving gear assembly 1 to the driven gear assembly 3 by the reversing clutching assembly 2, and in turn transmitted to the load.

In this embodiment, the reversing gear 201 in an initial state is at the disengaged position, and at a lateral side of the second gear 102 opposite to the output gear 301, as shown in FIG. 8. The reset member 202 is configured for maintaining the reversing gear 201 at the disengaged position, preferably is a torsion spring. The reset member 202 extends naturally at the disengaged position, and generates deformation along with the revolving of the reversing gear 201 to the engaged position. When the driving module 7 stops to provide torque, an elastic force of the deformed reset member 202 will restore to its original state, and in turn restore the reversing gear 201 to the disengaged position.

Figure 3:
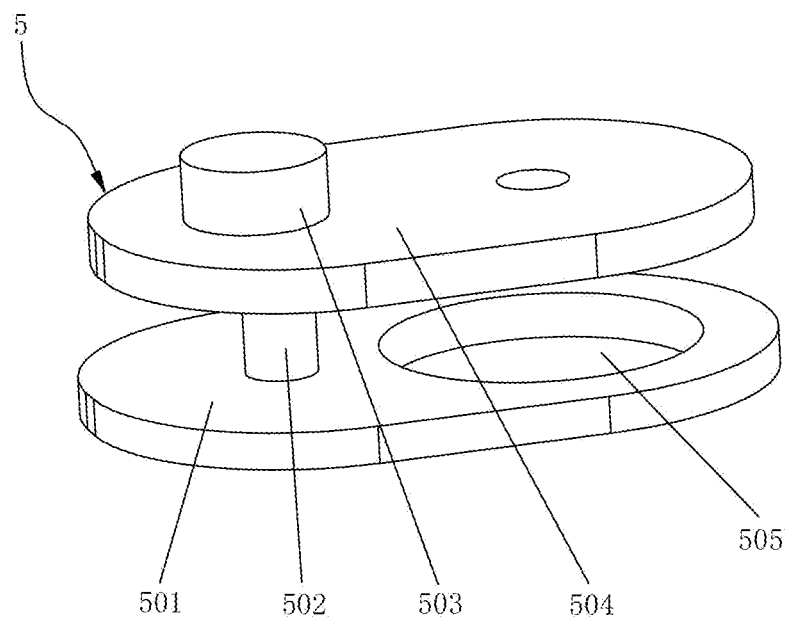
FIG. 3 is a structural schematic diagram of a gear carrier of the clutching structure.
Figure 4:
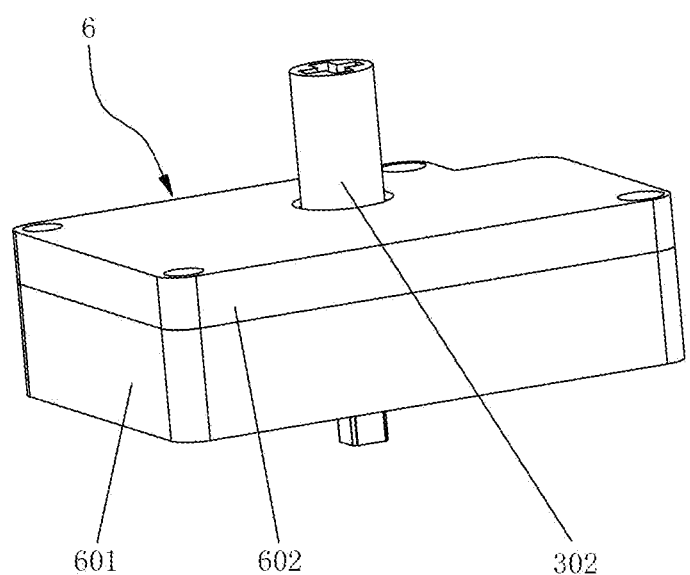
FIG. 4 is a structural schematic diagram of the clutching structure mounted in a housing.

Referring to FIG. 3, the reversing clutching assembly 2 further includes a gear carrier 5, wherein the gear carrier 5 includes a bottom plate 501, a top plate 504 and a connecting rod 502 being fixedly connected between the bottom plate 501 and the top plate 504. The reversing gear 201 is mounted around and fixed to the connecting rod 502, and sandwiched between the bottom plate 501 and top plate 504. When the reversing gear 201 revolves around the central axis X1 of the second gear 102, the gear carrier 5 also revolves around the central axis X1, meshing between the reversing gear 201 of the reversing clutching assembly 2 and the output gear 301 of the driven gear assembly 3 is achieved.

An outer side of the top plate 504 away from the reversing gear 201 is provided with a retaining column 503 at a position corresponding to the reversing gear 201. The reset member 202 is arranged at the outer side of the top plate 504 and at a position corresponding to the second gear 102. One end of the reset member 202 abuts against the retaining column 503 and the other end is fixed. In one embodiment, as shown in FIGS. 4-7, the present clutching structure is mounted in a housing 6, the other end of the reset member 202 is fixed to the housing 6. In the initial state, there is no external force applied to the clutching structure, the reset member 202 extends naturally to maintain the reversing clutching assembly 2 and driven gear assembly 3 in the disengaged position.

During power transmission of the present clutching structure, the driving module 7 starts to drive the second gear 102 to rotates, which makes the reversing gear 201 revolve around the central axis X1 of the second gear 102 until the reversing gear 201 meshes with the output gear 301. In sequence, the reversing gear 201 rotates about its central axis X2, and drives the output gear 301 to rotate a predetermined angle, thereby driving the load, such as the locking tab to move to realize locking or unlocking. The retaining column 503 of the gear carrier 5 swings along with the reversing gear 201 and pushes the end of the reset member 202 to move, the reset member 202 is thus pressed and accumulates elastic potential energy.

When the power transmission from the driving module 7 stops, the elastic potential energy of the reset member 202 is released to make the gear carrier 5 revolve inversely to its original position, such that the reversing clutching assembly 2 is disengaged from the driven gear assembly 3. In this situation, the output gear 301 can be rotated manually to drive the load, which can also realize locking or unlocking.

The driving module 7 includes a driving motor 701 and a transmission gear 703. The driving motor 701 may be a BLDC motor, and a worm 702 is mounted around a rotary shaft of the driving motor 701.

The transmission gear 703 includes a third gear 704 and a fourth gear 704 which are coaxially and fixedly connected to each other. Preferably, the third gear 704 and fourth gear 704 are integrally formed as one piece. The third gear 704 meshes with the worm 702, and the fourth gear 704 meshes with the first gear 101 of the driving gear assembly 1. A diameter of the third gear 704 is greater than that of the fourth gear 704, and thus the transmission gear 703 has an effect of speed reduction. In addition, cooperation of the worm 702 and the third gear 704 also has an effect of speed reduction, and an appropriate module is selected to ensure that the worm 702 may mesh with the third gear 704. In other embodiments, the third gear 704 may be a helical gear.

Figure 6:
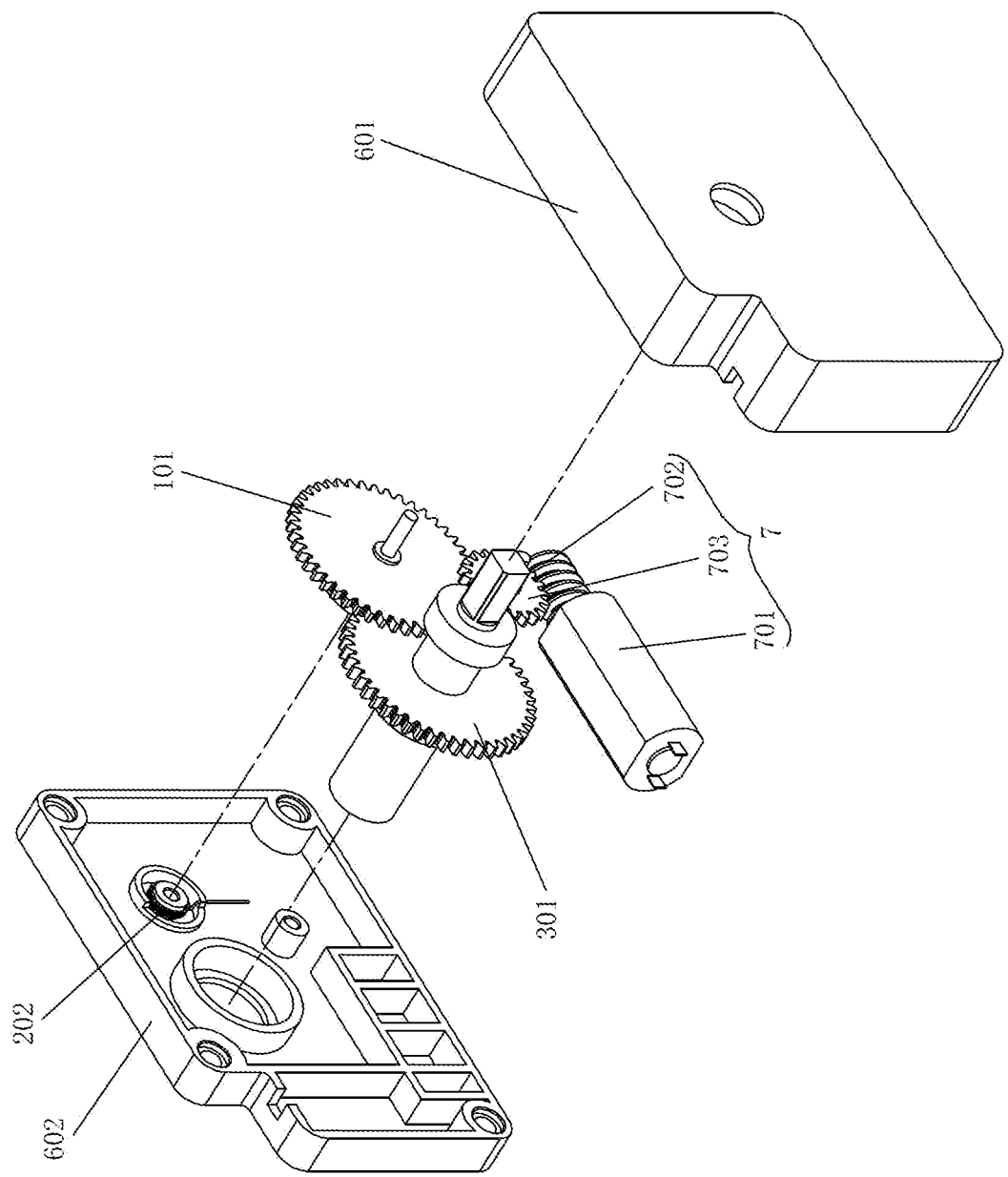
FIG. 6 is another aspect view of FIG. 5.

As shown in FIGS. 5-6, the housing 6 for the present manual/automatic dual-purpose clutching structure includes a housing body 601 and a cover plate 602 which are detachably connected together, wherein the driving gear assembly 1, the reversing clutching assembly 2 and the driven gear assembly 3 are all received inside the housing body 601. Two ends of the output shaft 302 of the output gear 301 extend through the cover plate 602 and housing body 601 for connecting the load. Rotating pivots 603, 604 are provided at middles of the rotatable gear and transmission gear 703 in penetrating manner, two ends of each rotating pivots 603, 604 are fixed to the housing body 601 and the cover plate 602 respectively.

The reset member 202 may be fixed to the cover plate 602 or the housing body 601. In this embodiment, as shown in FIGS. 6-7, the reset member 202 is fixed to the cover plate 602. Particularly, the housing body 601 and cover plate 602 each provide a sleeve 605 for inserting one corresponding end of the rotating pivot 603, and a concave is defined around the sleeve 605 of the cover plate 602 for accommodating the reset member 202. The gear carrier 5 is slidably arranged on the first gear 101, the second gear 102 extends into the gear carrier 5 via a through hole 505 defined in the bottom plate 501.

Figure 9:
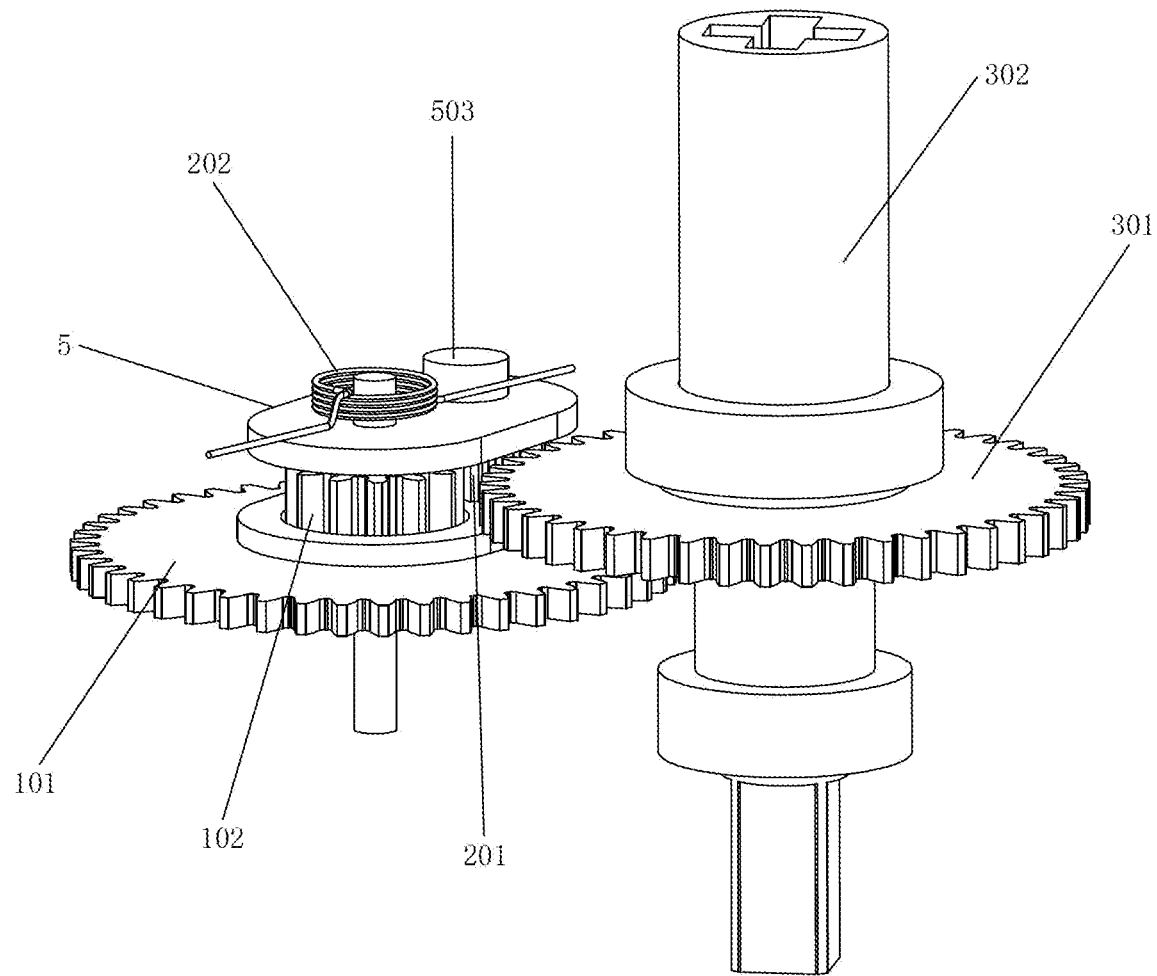
FIG. 9 is a schematic view of the clutching structure rotating anticlockwise to an engaged state.
Figure 10:
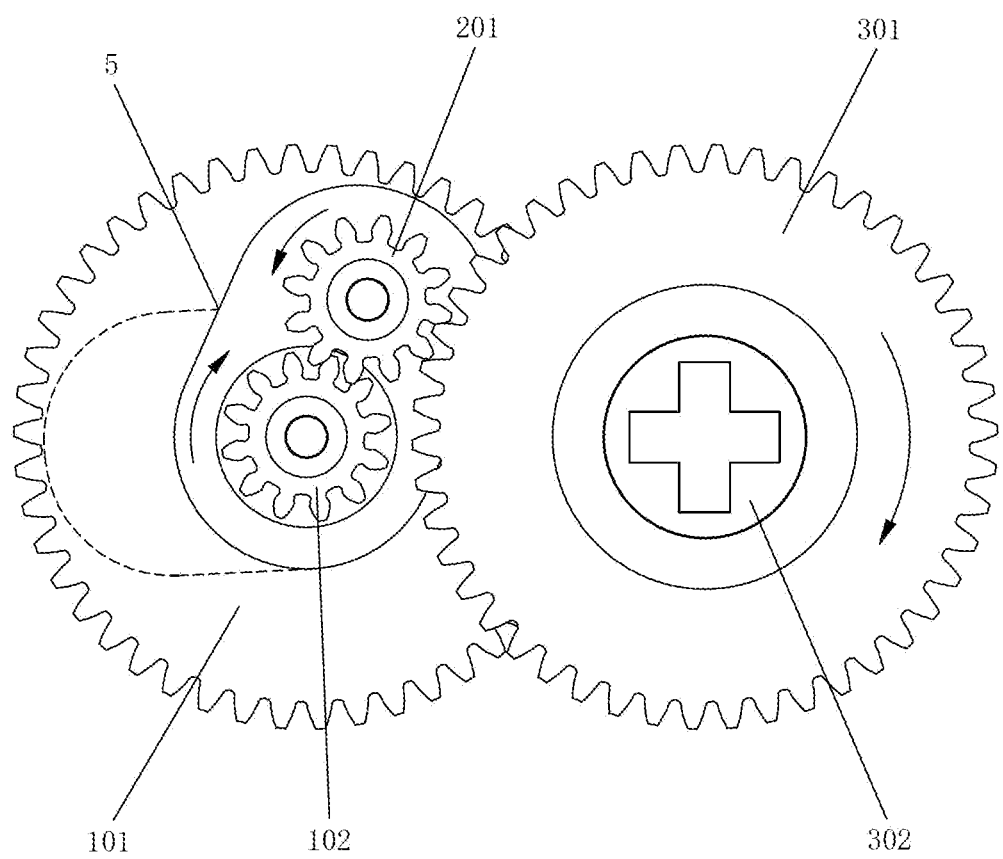
FIG. 10 is a plan view showing the position relationship of reversing and output gears of FIG. 9.
Figure 11:
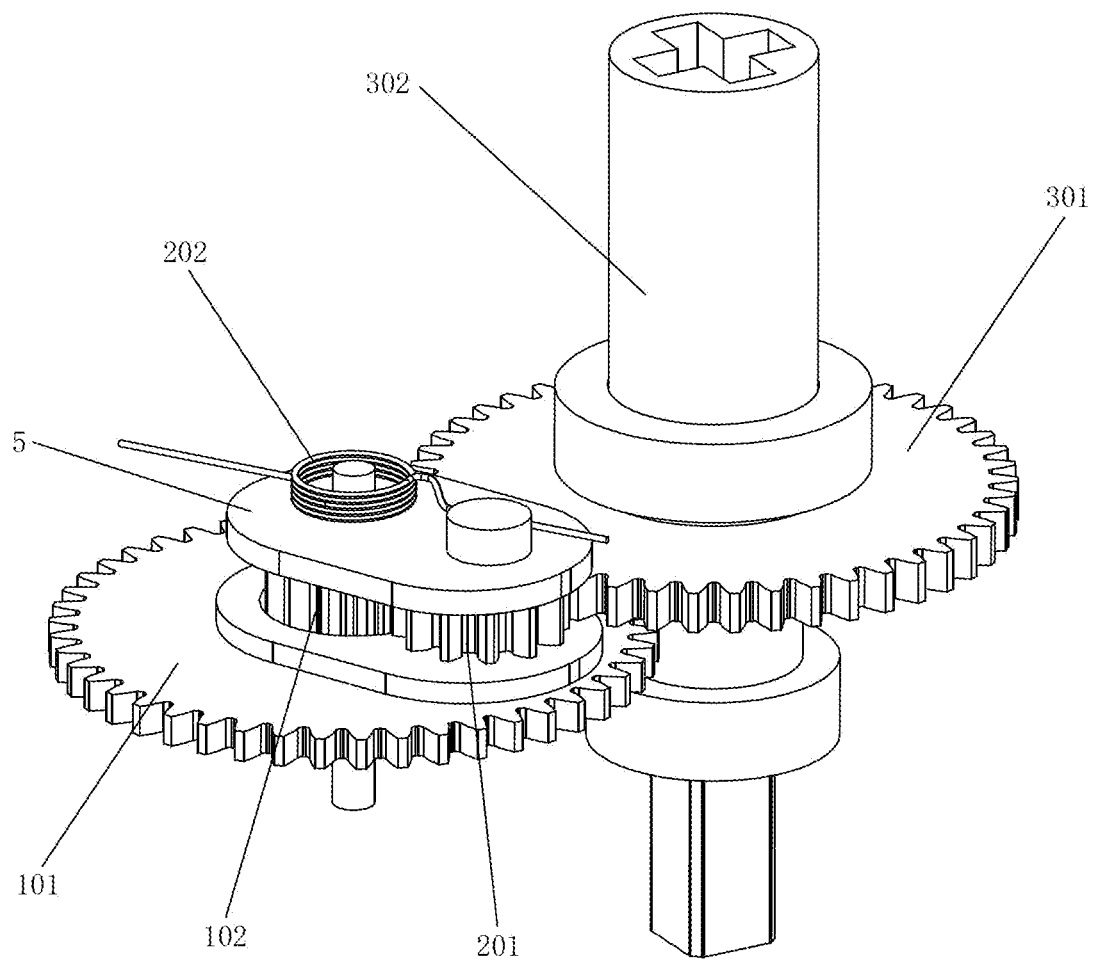
FIG. 11 is a schematic view of the clutching structure rotating clockwise to the engaged state.
Figure 12:
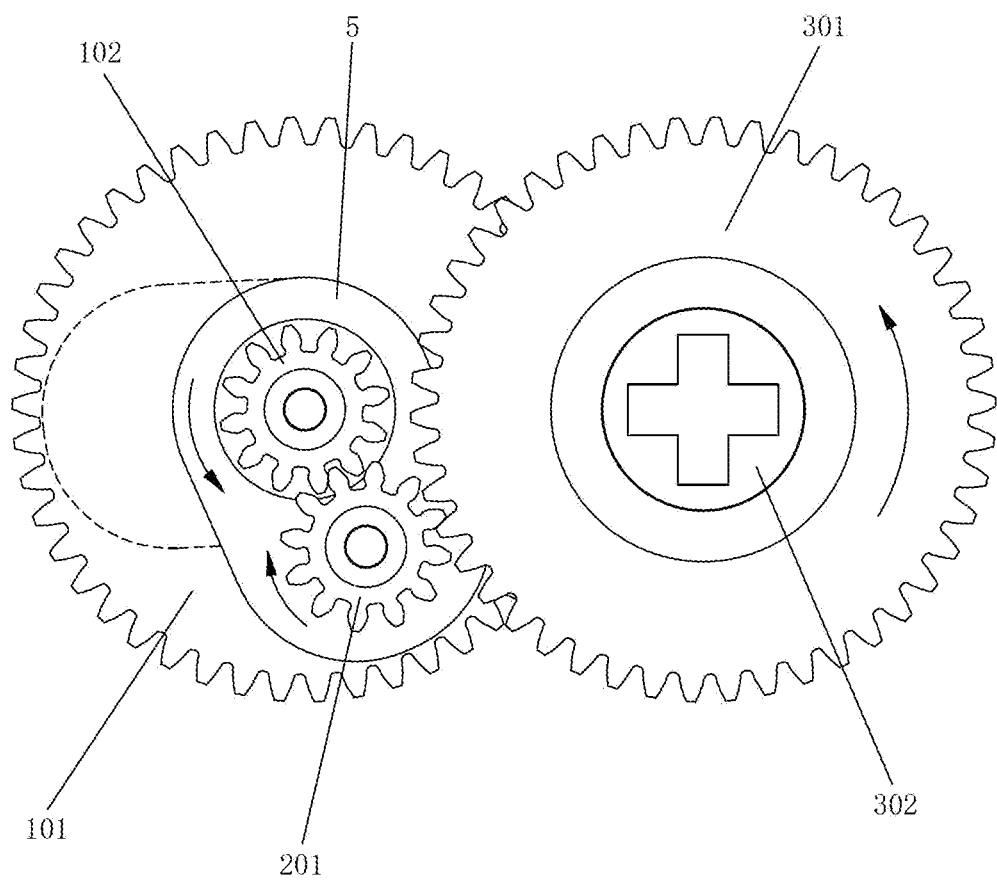
FIG. 12 is a plan view showing the position relationship of reversing and output gears of FIG. 11.

A working principle of the present clutching structure is as follows: when the clutching structure is in normal use, the driving motor 701 is started, and torque is transmitted to the second gear 102 of the driving gear assembly 1 through the meshed worm 702, the transmission gear 703 and the first gear 101, so as to make the reversing gear 201 of the reversing clutching assembly 2 which meshes with the second gear 102 to revolve clockwise (as shown in FIGS. 9-10) or anticlockwise (as shown in FIGS. 11-12). The reversing gear 201 revolves around the second gear 102 until it meshes with the output gear 301, and then the reversing gear 201 rotates about its central axis X2 to make the output gear 301 rotate a predetermined angle, thereby the output shaft 302 rotating along with the output gear 301 to drive the load, such as the locking tab to move, finally realizing automatic lock or unlock of the electronic product.

According to the rotating direction of the driving motor 701, the driving gear assembly 1 (including the first gear 101 and second gear 102) may rotate clockwise or anticlockwise. As shown in FIGS. 9-10, when the second gear 102 rotates clockwise, the reversing gear 201 swings clockwise to mesh with the output gear 301. Then, the meshed reversing gear 201 rotates anticlockwise and the meshed output gear 301 rotates clockwise, driving the load to move along a first direction. As shown in FIGS. 11-12, when the second gear 102 rotates anticlockwise, the reversing gear 201 swings anticlockwise to mesh with the output gear 301. Then, the meshed reversing gear 201 rotates clockwise and the meshed output gear 301 rotates anticlockwise, driving the load to move along a second direction opposite to the first direction.

In the normal process, the gear carrier 5 swings along with the reversing gear 201, the reset member 202 is deformed and accumulates a force. When the clutching structure is abnormal, such as the driving motor 701 stops unexpectedly, the driving gear assembly 1 no longer drives the reversing gear 201 to rotate. In this situation, the gear carrier 5 is restored under the action of the reset member 202, and the reversing gear 201 moves away from the output gear 301 to release the engagement between the reversing gear 201 and output gear 301, as shown in FIGS. 7-8. In this situation, the output gear 301 can be rotated manually, and thus the intelligent electronic product with the present clutching structure can be used when power is suddenly lost.

Although the embodiment of the present invention has been illustrated and described, it should be understood that those of ordinary skill in the art may make various changes, modifications, replacements and variations to the above embodiment without departing from the principle and spirit of the present invention, and the scope of the present invention is limited by the appended claims and their legal equivalents.

What is claimed is:

1. A manual/automatic dual-purpose clutching structure, comprising a driving gear assembly (1), a reversing clutching assembly (2) and a driven gear assembly (3), wherein
the driving gear assembly (1) comprises a first gear (101), a second gear (102) and a driving module (7), the first gear (101) being coaxially and fixedly connected to the second gear (102);
the reversing clutching assembly (2) comprises a reversing gear (201) and a reset spring (202), the reversing gear (201) is located on one side of the second gear (102) and meshes with the second gear (102);
the driven gear assembly (3) comprises an output gear (301) which is located on the other side of the second gear (102) and does not make contact with the second gear (102);
the reversing gear (201) rotates clockwise or anticlockwise around a central axis (X1) of the second gear (102) under a driving of the driving module (7) to mesh with the output gear (301) of the driven gear assembly (3); and after power of the driving module (7) disappears, the reversing gear (201) is prompted to be disengaged from the output gear (301) under an action of the reset spring (202) on the reversing gear (201).

2. The manual/automatic dual-purpose clutching structure according to claim 1, characterized in that
the reversing clutching assembly (2) comprises a gear carrier (5), the gear carrier (5) comprises a bottom plate (501), a top plate (504) and a connecting rod (502) being fixedly connected between the bottom plate (501) and top plate (504), the reversing gear (201) is mounted around the connecting rod (502) and sandwiched between the bottom plate (501) and top plate (504), and the bottom plate (501) defines a through hole (505) for extending of the second gear (102).

3. The manual/automatic dual-purpose clutching structure according to claim 2, characterized in that
an outer side of the top plate (504) away from the reversing gear (201) is provided with a retaining column (503), and the reset spring (202) is arranged on the outer side of the top plate (504) with one end thereof abutting against the retaining column (503).

4. The manual/automatic dual-purpose clutching structure according to claim 1, characterized in that
the driving module (7) comprise a driving motor (701) and a transmission gear (703), the transmission gear (703) comprises a third gear (704) and a fourth gear (705), the third gear (704) is coaxially and fixedly connected to the fourth gear (705), the third a third gear (704) is in transmission connection with the driving motor (701), and the fourth gear (705) meshes with the first gear (101).

5. The manual/automatic dual-purpose clutching structure according to claim 4, characterized in that
a worm (702) is mounted around a rotary shaft of the driving motor (701) and meshes with the third gear (704).

6. The manual/automatic dual-purpose clutching structure according to claim 4, characterized in that
the driving gear assembly (1), the reversing clutching assembly (2) and the driven gear assembly (3) are received in a housing body (601), a cover plate (602) is fixed on the housing body (601), and the output gear (301) has an output shaft (302) extending through the housing body (601) and/or cover plate (602) for connecting a load.

7. A manual/automatic dual-purpose clutching structure, comprising:
a driving gear assembly (1) comprising a rotatable gear and a driving motor (701) for driving the rotatable gear to rotate;
a reversing clutching assembly (2) comprising a reversing gear (201) meshing with the rotatable gear and a reset member (202) acting with the reversing gear (201); and
a driven gear assembly (3) comprising an output gear (301) spaced from the rotatable gear; wherein
when the driving motor (701) starts, the reversing gear (201) revolves around the rotatable gear from a disengaged position where the reversing gear (201) is disengaged from the output gear (301) to an engaged position where the reversing gear (201) is engaged with the output gear (301), and the reset member (202) is deformed; and when the driving motor (701) stops, the deformed reset member (202) restores to its original state and in turn restore the reversing gear (201) to the disengaged position.

8. The manual/automatic dual-purpose clutching structure according to claim 7, wherein the rotatable gear comprises a first gear (101) and a second gear (102), the second gear (102) is less than the first gear (101) in diameter, the first gear (101) is in transmission connection with the driving motor (701), and the second gear (102) meshes with the reversing gear (201).

9. The manual/automatic dual-purpose clutching structure according to claim 8, wherein a transmission gear (703) is arranged between the first gear (101) and the driving motor (701), the transmission gear (703) comprises a third gear (704) and a fourth gear (705), the fourth gear (705) is less than the third gear (704) in diameter, the third gear (704) is in transmission connection with the driving motor (701), and the fourth gear (705) meshes with the first gear (101).

10. The manual/automatic dual-purpose clutching structure according to claim 9, wherein a worm (702) is mounted around a rotary shaft of the driving motor (701) and meshes with the third gear (704).

11. The manual/automatic dual-purpose clutching structure according to claim 8, wherein the first gear (101) and second gear (102) are coaxial, a rotating pivot (603) is provided at middles of the first gear (101) and second gear (102) in penetrating manner, and the reset member (202) is a torsion spring and mounted around the rotating pivot (603).

12. The manual/automatic dual-purpose clutching structure according to claim 11, wherein the reversing clutching assembly (2) comprises a gear carrier (5), the gear carrier (5) comprises a bottom plate (501), a top plate (504) and a connecting rod (502) connected between the bottom plate (501) and top plate (504), the reversing gear (201) is mounted around the connecting rod (502), a retaining column (503) is provided on the top plate (504) at a positon corresponding to the reversing gear (201), and one end of the reset member (202) abuts against the retaining column (503).

13. The manual/automatic dual-purpose clutching structure according to claim 12, wherein the bottom plate (501) defines a through hole (505), and the second gear (102) extends into the gear carrier (5) via the through hole (505).

14. The manual/automatic dual-purpose clutching structure according to claim 12, wherein the driving gear assembly (1), the reversing clutching assembly (2) and the driven gear assembly (3) are received in a housing (6), and the other end of the reset member (202) is fixed to the housing (6).

15. The manual/automatic dual-purpose clutching structure according to claim 14, wherein the housing (6) forms a sleeve (605) for supporting a rotating pivot (603) of the second gear (102), and the reset member (202) is mounted around the sleeve (605).

16. The manual/automatic dual-purpose clutching structure according to claim 14, wherein the output gear (301) has an output shaft (302) which extends through the housing (6) for driving a latching tab of an electronic lock.

17. The manual/automatic dual-purpose clutching structure according to claim 8, wherein a radial gap is defined between the second gear (102) and output gear (301) with a width less than a diameter of the reversing gear (201).

\* \* \* \* \*